US009426817B2

(12) United States Patent
Kawasaki

(10) Patent No.: US 9,426,817 B2
(45) Date of Patent: Aug. 23, 2016

(54) RADIO COMMUNICATION BASE STATION

(71) Applicant: KYOCERA CORPORATION, Kyoto (JP)

(72) Inventor: Toshinori Kawasaki, Higashiosaka (JP)

(73) Assignee: KYOCERA Corporation, Kyoto (JP)

( * ) Notice: Subject to any disclaimer, the term of this patent is extended or adjusted under 35 U.S.C. 154(b) by 81 days.

(21) Appl. No.: 14/350,003

(22) PCT Filed: Oct. 3, 2012

(86) PCT No.: PCT/JP2012/006342
§ 371 (c)(1),
(2) Date: Apr. 4, 2014

(87) PCT Pub. No.: WO2013/051253
PCT Pub. Date: Apr. 11, 2013

(65) Prior Publication Data
US 2014/0248894 A1 Sep. 4, 2014

(30) Foreign Application Priority Data
Oct. 5, 2011 (JP) ................................. 2011-221267

(51) Int. Cl.
H04W 72/10 (2009.01)
H04W 36/00 (2009.01)
(Continued)

(52) U.S. Cl.
CPC .............. *H04W 72/10* (2013.01); *H04W 28/26* (2013.01); *H04W 36/0083* (2013.01); *H04W 28/0226* (2013.01); *H04W 36/18* (2013.01); *H04W 72/048* (2013.01)

(58) Field of Classification Search
CPC .. H04W 28/26; H04W 72/06; H04L 12/5695; H04L 47/824
See application file for complete search history.

(56) References Cited

U.S. PATENT DOCUMENTS 6,577,607 B1 * 6/2003 Mitts ................... H04Q 11/0478
370/256
6,907,243 B1 * 6/2005 Patel ............................ 455/442
(Continued)

FOREIGN PATENT DOCUMENTS

JP 2000-358265 A 12/2000
JP 2007-166000 A 6/2007
(Continued)

OTHER PUBLICATIONS

International Search Report; PCT/JP2012/006342; Dec. 25, 2012.
(Continued)

Primary Examiner — Khalid Shaheed
Assistant Examiner — Ernest Tacsik
(74) Attorney, Agent, or Firm — Studebaker & Brackett PC

(57) ABSTRACT

A radio communication base station allocates the same radio resource as a radio resource used for communication between the radio communication base station and a radio communication terminal in other radio communication base station to be a radio resource used in the other radio communication base station for communication between the other radio communication base station and the radio communication terminal. The radio communication base station includes a control unit that performs control to allocate a radio resource used for communication between a radio communication terminal moving at at least a predetermined speed and the other radio communication base station on a priority basis in accordance with content of service in the communication.

4 Claims, 8 Drawing Sheets

(51) Int. Cl.
  *H04W 28/26* (2009.01)
  *H04W 36/18* (2009.01)
  *H04W 72/04* (2009.01)
  *H04W 28/02* (2009.01)

(56) References Cited

U.S. PATENT DOCUMENTS

2001/0030953 A1\* 10/2001 Chang ............................ 370/331
2005/0075110 A1\* 4/2005 Posti et al. ................. 455/452.1
2006/0039318 A1\* 2/2006 Oh ........................ H04L 5/0007
                                                              370/328
2007/0135150 A1   6/2007 Ushiki et al.
2009/0129335 A1\* 5/2009 Lee et al. ...................... 370/331
2011/0014915 A1\* 1/2011 Chen .................... H04W 72/048
                                                              455/437
2011/0212727 A1\* 9/2011 Song et al. ................... 455/437

FOREIGN PATENT DOCUMENTS

JP   2008-187369 A   8/2008
JP   2008-236677 A   10/2008
JP   2009-206641 A   9/2009

OTHER PUBLICATIONS

3GPP TS 36.213 V9.2.0 (Jun. 2010); 3rd Generation Partnership Project; Technical Specification Group Radio Access Network; Evolved Universal Terrestrial Radio Access (E-UTRA); Physical layer procedures (Release 9); pp. 1-80.

\* cited by examiner

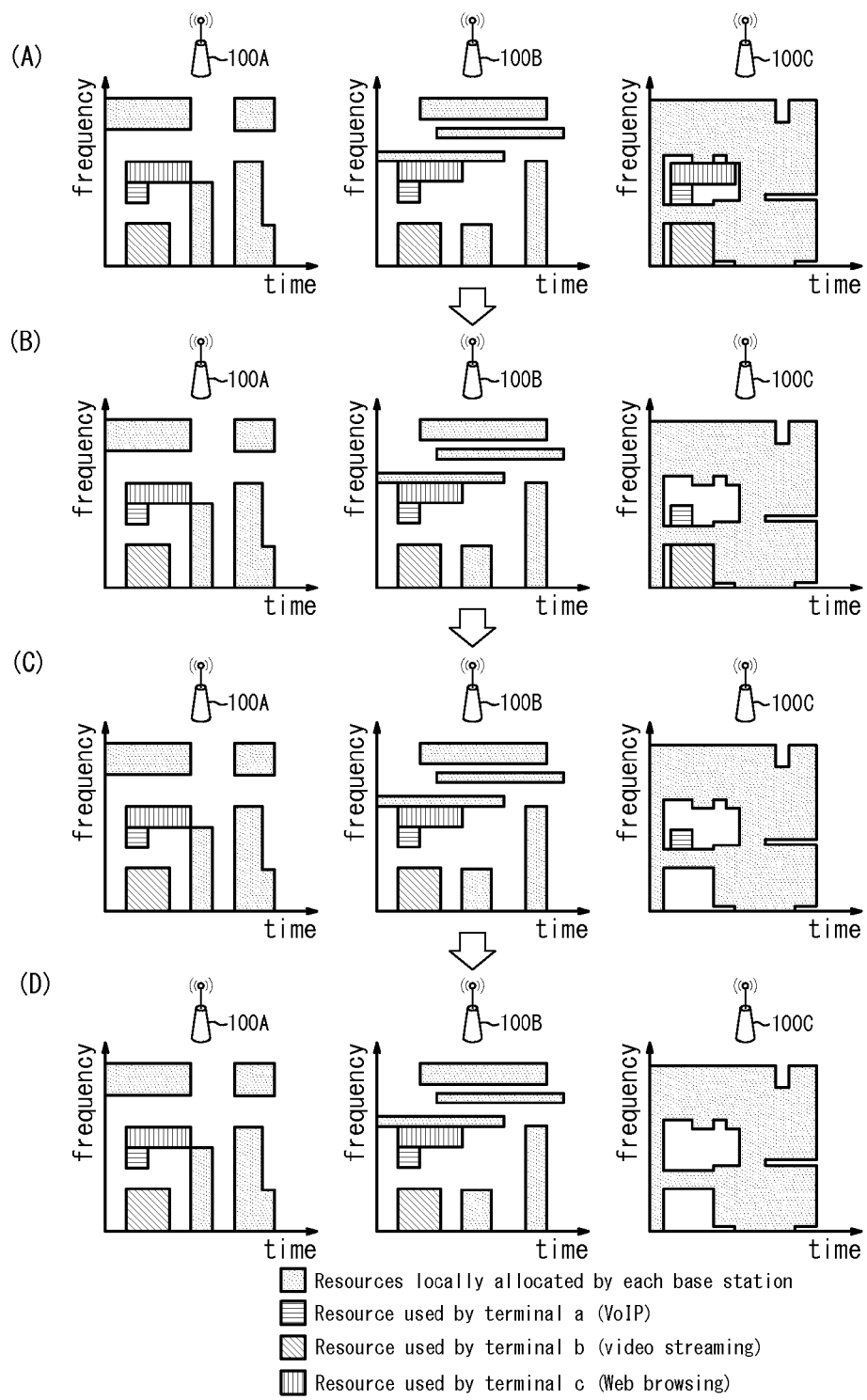

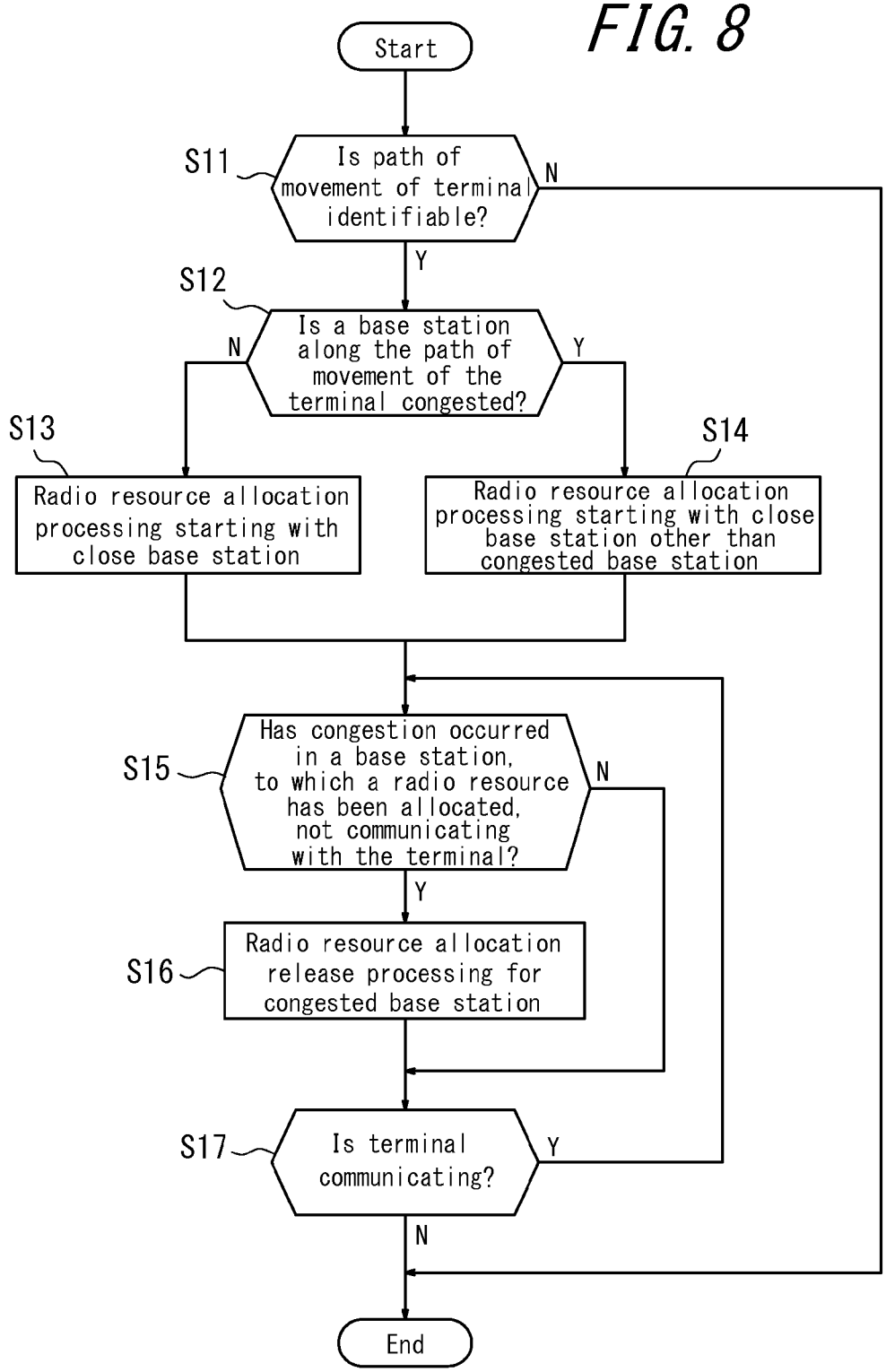

RADIO COMMUNICATION BASE STATION

CROSS-REFERENCE TO RELATED APPLICATION

This application claims priority to and the benefit of Japanese Patent Application No. 2011-221267 filed Oct. 5, 2011, the entire contents of which are incorporated herein by reference.

TECHNICAL FIELD

The present invention relates to a radio communication base station, and in particular to a radio communication base station that allocates a radio resource in another radio communication base station.

BACKGROUND

The Long Term Evolution (LTE) system has been standardized in the 3rd Generation Partnership Project (3GPP) as a global standard for radio communication systems. In LTE, the transmission bandwidth for radio communication between a radio communication base station and a radio communication terminal (mobile terminal) is allocated into resource blocks (RB) as minimal units. The bandwidth of a resource block is 180 kHz. For each subframe (1 ms), the radio communication base station schedules the radio resource allocated to each mobile terminal. In the present disclosure, a radio communication base station is abbreviated as a "base station" as appropriate, and a radio communication terminal (mobile terminal) is abbreviated as a "terminal" as appropriate.

In the LTE system, in order to use the radio communication band efficiently, the base station schedules radio resources allocated to the terminals based on the transmission request data size and on the radio quality between the base station and the terminals. More resource blocks are allocated to a terminal with a large transmission data size, and fewer resource blocks are allocated to a terminal with a small transmission data size. The question of whether radio quality between the terminals and the base station is good, i.e. whether the Signal to Interference and Noise Ratio (SINR) is large, is also considered when scheduling radio resources allocated to the terminals.

Using a reference signal, radio quality is measured for both the uplink, i.e. data transmission from the terminal to the base station, and the downlink, i.e. data transmission from the base station to the terminal. The radio quality of the downlink is determined by the terminal measuring the SINR for a reference signal transmitted from the base station to the terminal. The terminal provides feedback on the radio quality to the base station by transmitting the measured SINR in correspondence with a Channel Quality Indicator (CQI) to the base station. The terminal reports the CQI to the base station periodically. The radio quality of the uplink is determined by the base station measuring the SINR for a reference signal transmitted from the terminal to the base station (for example, see Non-patent Literature 1). In this way, based on the radio quality at the latest report time, the base station schedules the radio resources allocated to the terminals. The radio communication band can thus be used efficiently.

A technique for allocating radio resources to a group of base stations has also been proposed (for example, see Patent Literature 1). According to the technique disclosed in Patent Literature 1, when the terminal is moving at high speed, or even when many terminals are connected to the base stations in a short period of time, it is possible to reduce the processing load for allocating radio resources used in communication between the plurality of base stations and terminals, for authentication, and the like. Accordingly, with the technique disclosed in Patent Literature 1, the base station can allocate channels to terminals efficiently and at high speed.

CITATION LIST

Non-patent Literature 1: 3GPP TS 36.213 V9.2.0 (2010-06), "Physical layer procedures"
Patent Literature 1: JP2007-166000A

SUMMARY

When a terminal is moving at high speed, wasteful performance of repeated handovers can be avoided by, for example, allocating the same radio resource in a plurality of adjacent base stations. Movement at high speed is assumed to occur when, for example, the terminal is communicating while moving in a train, a car, or the like. Communication with such a terminal moving at high speed may be performed by having the radio resource for reporting allocation information from a plurality of base stations (control channel) and the allocated radio resource (communications channel) be the same for each base station. In this way, communication with base stations is possible in a radio communications area without performing a procedure for changing base stations. Also, when the optimal base station changes during movement, the optimal base station can be selected instantaneously, and communication with the optimal base station can be performed. Furthermore, combining the uplink/downlink signals (undecoded signals) of the plurality of base stations can yield some gain.

Thus avoiding repeated handovers for a terminal moving at high speed yields the benefit of preventing voice from being cut off or delayed during, for example, voice communication that needs to be performed in real-time with a protocol such as VoIP. Accordingly, in a communication system such as LTE, when the terminal is communicating with a protocol such as VoIP while moving at high speed, it is preferable to allocate the same radio resource in, for example, another adjacent base station in order to avoid a handover insofar as possible.

In the other base station, however, if the radio resource has already been allocated to another terminal communicating, for example, by video streaming or the like, it may not be possible to allocate the same radio resource for the terminal performing voice communication such as VoIP. In such a case, it is assumed that if the terminal performing voice communication is moving at high speed, undesirable effects will occur such as voice being cut off or delayed. In other words, conventionally the type of communication service being performed by a terminal has not been taken into consideration when a plurality of base stations allocate the same radio resource for communication with the terminal. Therefore, blocking allocation of the same radio resource leads to the risk of undesirable effects in radio communication if a terminal moving at high speed is performing a service in which QoS is crucial, i.e. a service that is easily affected by delays due to handovers.

Even if another base station attempts to allocate the same radio resource, congestion may be occurring in the other base station. It is also possible that congestion will occur in another base station after the other base station allocates the same radio resource. In such cases as well, there is a risk of undesirable effects in radio communication in which the other base station is involved.

The present invention has therefore been conceived in light of the above circumstances and provides a radio communication base station that allocates the same radio resource in another radio communication base station at a priority in accordance with the content of service in communication performed with a radio communication terminal moving at high speed.

A radio communication base station according to a first aspect of the present invention is a radio communication base station that allocates the same radio resource as a radio resource used for communication between the radio communication base station and a radio communication terminal in other radio communication base station to be a radio resource used in the other radio communication base station for communication between the other radio communication base station and the radio communication terminal, the radio communication base station including a control unit configured to perform control to allocate a radio resource used for communication between a radio communication terminal moving at at least a predetermined speed and the other radio communication base station on a priority basis in accordance with content of service in the communication.

A second aspect of the present invention is the radio communication base station according to the first aspect, such that the control unit performs control to allocate the radio resource used for communication between the radio communication terminal moving at at least the predetermined speed and the other radio communication base station on a priority basis based on real-timeness and/or communication volume requested for service in the communication.

A third aspect of the present invention is the radio communication base station according to the first or second aspect, such that the control unit performs control to allocate the radio resource used for communication between the radio communication terminal moving at at least the predetermined speed and the other radio communication base station on a priority basis in accordance with content of service in the communication when congestion does not occur in the other radio communication base station.

A fourth aspect of the present invention is the radio communication base station according to the third aspect, such that the control unit performs control not to allocate the radio resource used for communication between the radio communication terminal moving at at least the predetermined speed and the other radio communication base station when congestion occurs in the other radio communication base station.

A fifth aspect of the present invention is the radio communication base station according to the third aspect, such that when congestion occurs in the other radio communication base station after allocation of the radio resource used for communication between the radio communication terminal moving at at least the predetermined speed and the other radio communication base station, the control unit performs control so that allocation of the radio resource that was allocated on a priority basis in accordance with content of service in the communication is released based on priority at a time of allocation.

A sixth aspect of the present invention is the radio communication base station according to the fifth aspect, such that the control unit performs control so that allocation of the radio resource that was allocated on a priority basis in accordance with content of service in the communication is released according to an opposite priority from the time of allocation.

According to the radio communication base station of the present invention, it is possible to allocate the same radio resource in another radio communication base station at a priority in accordance with the content of service in communication performed with a radio communication terminal moving at high speed.

BRIEF DESCRIPTION OF DRAWINGS

The present invention will be further described below with reference to the accompanying drawings, wherein:

FIG. 7 illustrates yet another example of radio resource allocation according to an embodiment of the present invention; and FIG. 8 is a flowchart showing radio resource allocation and release processing according to an embodiment of the present invention.

DESCRIPTION OF EMBODIMENTS

With reference to the drawings, the following describes an embodiment of the present invention.

Figure 1:
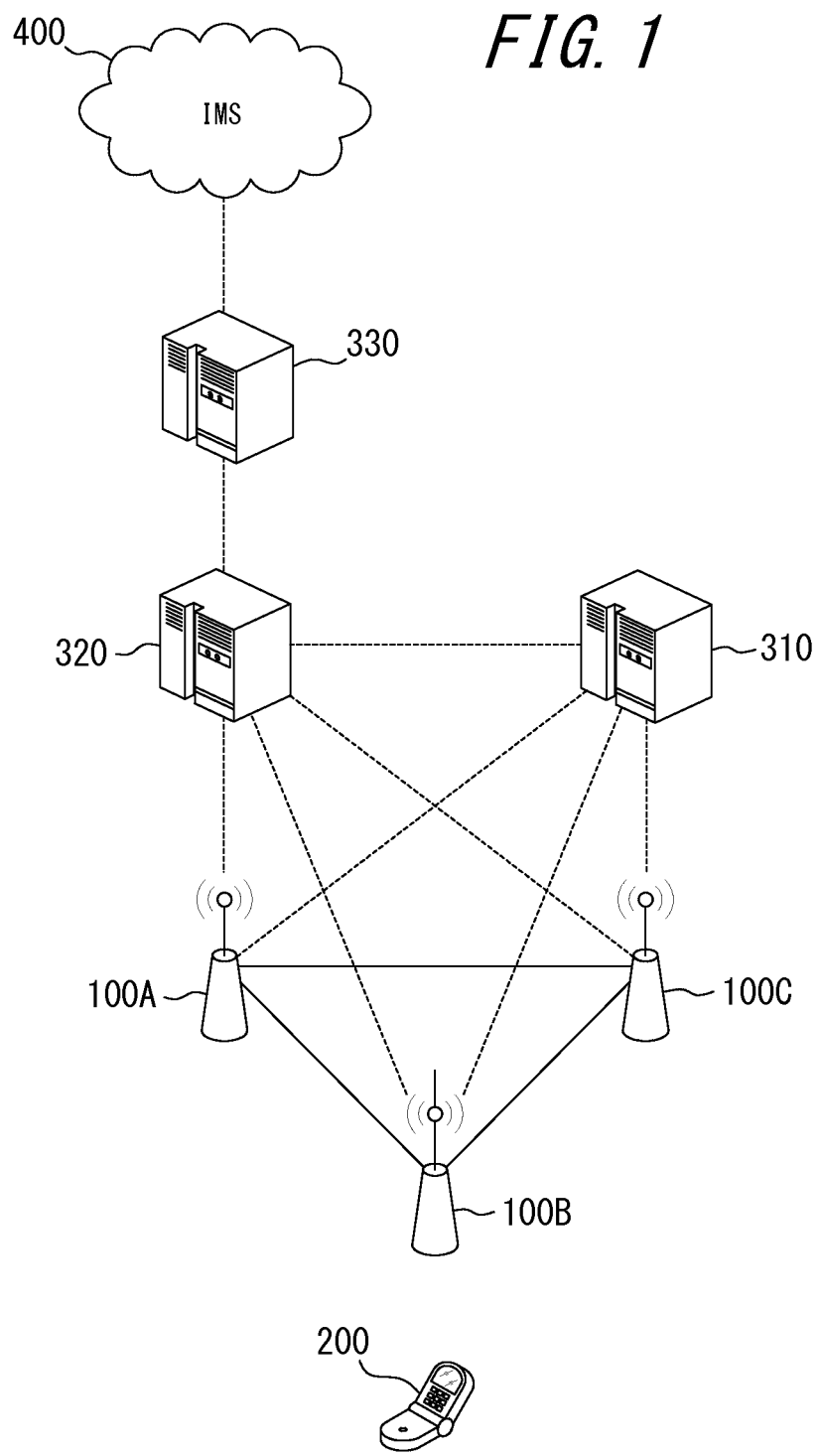
FIG. 1 schematically illustrates the structure of a radio communication system according to an embodiment of the present invention.

FIG. 1 schematically illustrates an exemplary structure of a radio communication system that includes a radio communication base station according to an embodiment of the present invention. The radio communication system according to the present embodiment can, for example, be implemented with an LTE system.

As illustrated in FIG. 1, the radio communication system according to the present embodiment includes base stations 100, a terminal 200, Mobility Management Equipment (MME) 310, a Serving-Gateway (S-GW) 320, a PDN-Gateway (P-GW) 330, and an IP Multimedia Subsystem (IMS) 400. The example of a radio communication system illustrated in FIG. 1 includes three base stations. In FIG. 1, the base stations are shown as base station 100A, base station 100B, and base station 100C, each forming a cell. In the radio communication system according to the present embodiment, the number of base stations may be any number two or greater.

Each base station 100 allocates radio resources for the terminal 200 to perform radio communication. The terminal 200 performs radio communication via the base station 100. The MME 310 performs mobility management, such as position registration for the terminal 200, terminal call processing upon an incoming call, and handovers between base stations 100. The S-GW 320 processes user data, such as voice, packets, and the like. The P-GW 330 has an interface with the IMS 400. The IMS 400 is a public telecommunication network supporting multimedia services using Session Initiation Protocol (SIP).

In FIG. 1, the base station 100A, base station 100B, and base station 100C are connected to each other by an interface called X2. The MME 310 is connected to base station 100A, base station 100B, and base station 100C by an interface called S1-MME. The S-GW 320 is connected to base station 100A, base station 100B, and base station 100C by an interface called S1-U. The MME 310 and the S-GW 320 are connected by an interface called S11. The S-GW 320 and the P-GW 330 are connected by an interface called S5. The P-GW 330 and the IMS 400 are connected by an interface called SGi.

It is also assumed that P-GWs other than the P-GW 330 illustrated in FIG. 1 are connected to the IMS 400. Furthermore, it is assumed that the P-GWs other than the P-GW 330 are connected to a radio communication system formed by a similar node group as the base stations 100, terminal 200, MME 310, and S-GW 320 in FIG. 1.

Figure 2:
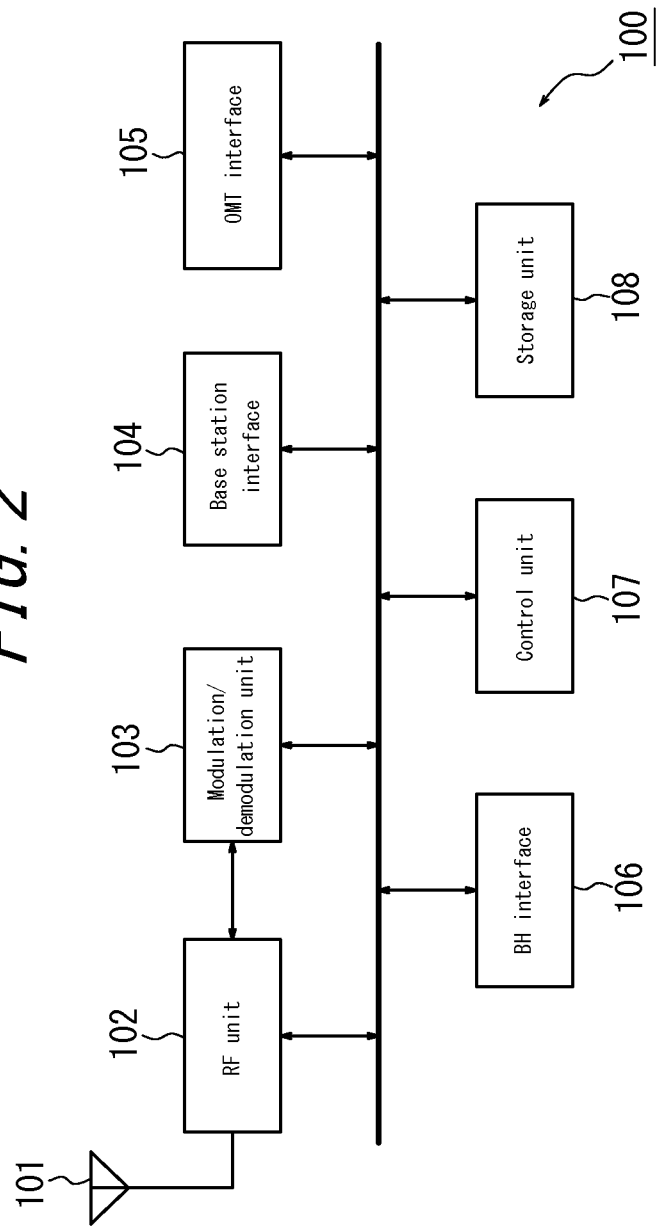
FIG. 2 schematically illustrates the structure of a base station according to an embodiment of the present invention.

FIG. 2 schematically illustrates an exemplary structure of the base station 100 in FIG. 1. As illustrated in FIG. 2, the base station 100 is provided with an RF antenna 101, an RF unit 102, a modulation/demodulation unit 103, a base station interface 104, an Operation Maintenance Tool (OMT) interface 105, a backhaul (BH) interface 106, a control unit 107, and a storage unit 108.

The RF antenna 101 transmits RF signals to the terminal 200 and receives RF signals from the terminal 200. The RF unit 102 converts the RF signals transmitted and received by the RF antenna 101 into an RF band and a band that can be processed digitally. The modulation/demodulation unit 103 modulates the signal output to the RF unit 102 and demodulates the signal input from the RF unit 102. The base station interface 104 functions as an interface with other base stations. The OMT interface 105 functions as an interface when an operator controls the base station 100 manually. The BH interface 106 functions as an interface with the core network. The control unit 107 controls and manages the entire base station 100, starting with the functional units thereof, and may be configured using a CPU. In particular, in the present embodiment, the control unit 107 performs control for allocating a radio resource used for radio communication with the terminal 200. In greater detail, the control unit 107 includes a scheduler and schedules the radio resources allocated to terminals. The control by the control unit 107 for radio resource allocation that is particular to the present embodiment is described in further detail below. The storage unit 108 is a memory that can store a variety of data.

Figure 3:
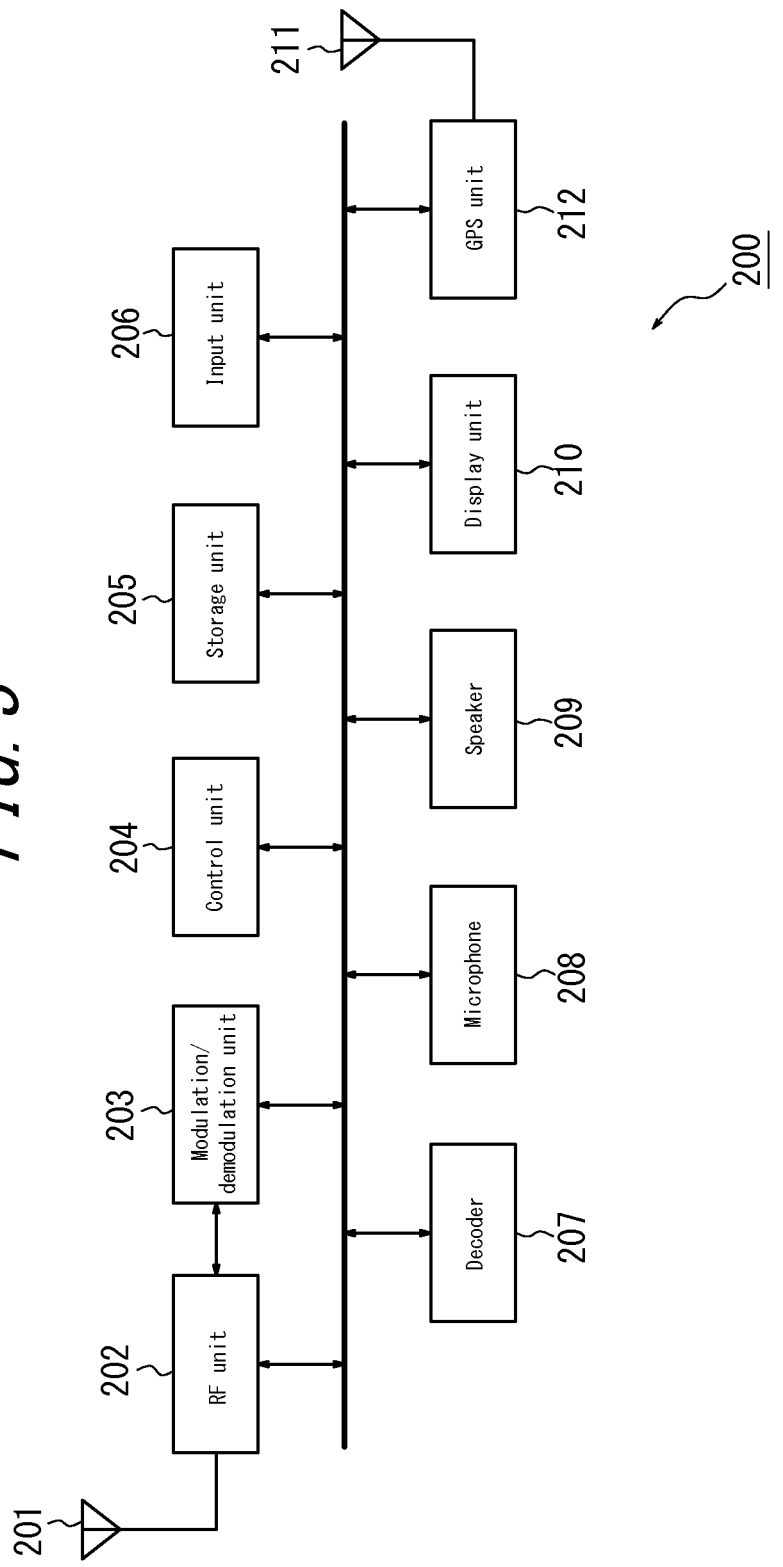
FIG. 3 schematically illustrates the structure of a terminal according to an embodiment of the present invention.

FIG. 3 schematically illustrates an exemplary structure of the terminal 200 in FIG. 1. As illustrated in FIG. 3, the terminal 200 is provided with an RF antenna 201, an RF unit 202, a modulation/demodulation unit 203, a control unit 204, a storage unit 205, an input unit 206, a decoder 207, a microphone 208, a speaker 209, a display unit 210, a GPS antenna 211, and a GPS unit 212.

The RF antenna 201 transmits RF signals to the base station 100 and receives RF signals from the base station 100. The RF unit 202 converts the RF signals transmitted and received by the RF antenna 201 into an RF band and a band that can be processed digitally. The modulation/demodulation unit 203 modulates the signal output to the RF unit 202 and demodulates the signal input from the RF unit 202. The control unit 204 controls and manages the entire terminal 200, starting with the functional units thereof, and may be configured using a CPU. In particular, in the present embodiment, the control unit 204 performs control for the terminal 200 to communicate with the base station 100 in accordance with radio resource allocation as reported by the base station 100. The storage unit 205 is a memory that can store a variety of data.

The input unit 206 detects various input operations by the operator. The decoder 207 decodes audio signals and video signals. The microphone 208 detects sound and converts the sound to an electronic signal. The speaker 209 converts an electronic signal representing sound into actual sound. The display unit 210 may be configured using an LCD, an organic EL display, or the like and displays a variety of images. The GPS antenna 211 receives signals from satellites. The GPS unit 212 detects position via a Global Positioning System (GPS).

Next, the basic concept of radio resource allocation processing according to an embodiment of the present invention is explained.

Figure 4:
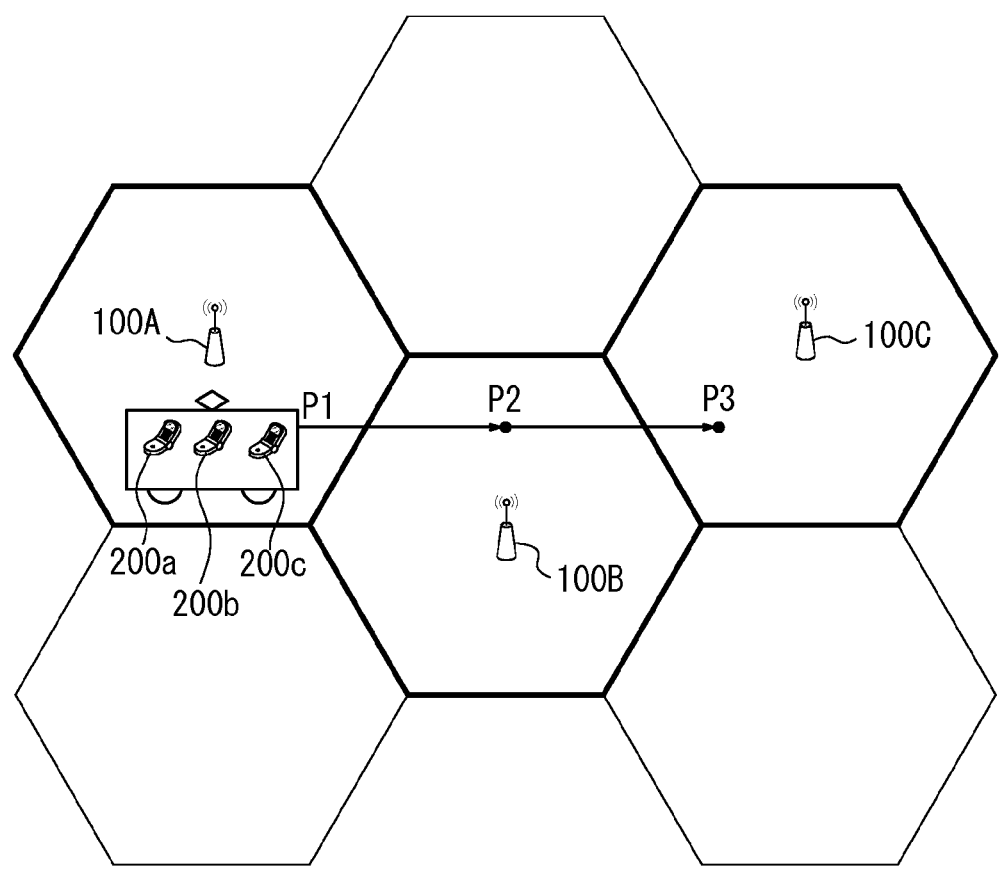
FIG. 4 conceptually illustrates radio resource allocation processing according to an embodiment of the present invention.

FIG. 4 schematically illustrates the positional relationships between the base stations 100 and terminals 200 according to an embodiment of the present invention. As illustrated in FIG. 4, three of the base stations 100, i.e. base station 100A, base station 100B, and base station 100C, are located at the illustrated positions. As also illustrated in FIG. 4, three of the terminals 200, i.e. terminal 200a, terminal 200b, and terminal 200c, are located at the illustrated positions. Furthermore, as illustrated in FIG. 4, the terminal 200a, terminal 200b, and terminal 200c are assumed to be moving at high speed on the same train. In the present invention, "high speed" is envisioned as the speed of movement when on a train or in a car, for example, and can be set to a speed exceeding approximately 60 km/h, for example. Note that in the present invention, a "high speed" is not limited to a speed exceeding approximately 60 km/h yet is preferably a speed faster than human walking speed (approximately 5 km/h). In the example in FIG. 4, the three terminals 200 are moving in the same train in order to explain the present embodiment by comparing different services in communication by a plurality of terminals located at nearly the same position. Accordingly, in the present invention, it is not essential that these terminals be moving in the same vehicle on the same path.

As illustrated in FIG. 4, the terminal 200a, terminal 200b, and terminal 200c are on the same train and are moving from a current position P1 to position P3 via P2. At the present time, the terminals 200a, 200b, and 200c are each communicating with the base station 100A and will communicate with the base station 100B and then the base station 100C as a result of movement. As an example, the terminal 200a is assumed to be performing communication using VoIP, the terminal 200b to be performing communication for video streaming, and the terminal 200c to be performing communication for Web browsing. Accordingly, the communication using VoIP performed by the terminal 200a requires a higher degree of real-timeness for the service in the communication than the communication for video streaming performed by 200b and the communication for Web browsing performed by the terminal 200c. However, since the communication using VoIP performed by the terminal 200a is voice communication, the required speed is not as high as in the communication for video streaming performed by the terminal 200b (i.e. the communication volume is low). Furthermore, since the communication using VoIP performed by the terminal 200a is voice communication, the required speed is not as high as in the communication for sending or receiving multiple videos or still images during the communication for Web browsing performed by the terminal 200c.

In the radio resource allocation processing according to the present embodiment, a master base station that controls other base stations is selected from among the plurality of base stations. Regarding selection of the master base station, for example when a base station 100 that has started to communicate with a terminal 200 receives a report from the terminal 200 that the terminal 200 is moving at high speed, the base station 100 can be selected as the master base station. In greater detail, for example when the base station 100A receives a report of position information acquired by the GPS unit 212 of the terminal 200a and detects that the terminal 200a is moving at a speed exceeding 60 km/h, the base station 100A can be selected as the master base station.

In FIG. 4, as an example the base station 100A is assumed to be the master base station. In this case, this master base station 100A performs processing to allocate the same radio resource as the radio resource used for communication between the base station 100A and the terminal 200 to be the radio resource used in another radio base station 100B for communication between the other base station 100B and the terminal 200. In this context, the "same radio resource" means a radio resource having the same frequency domain and the same time domain. Similarly, the master base station 100A performs processing to allocate the same radio resource as the radio resource used for communication between the base station 100A and the terminal 200 to be the radio resource used in another radio base station 100C for communication between the other base station 100C and the terminal 200. In greater detail, the master base station 100A for example reports on allocation of the same radio resource as the master base station 100A to a device such as the MME 310 in FIG. 1 via a backhaul link. The MME 310, having received the report of allocation of the same radio resource as the master base station 100A, can perform processing such as issuing an instruction to the other base stations 100B and 100C, which are the target of same radio resource allocation, to allocate the same radio resource.

In the radio resource allocation processing according to the present embodiment, the master base station performs processing to select the next master base station in accordance with movement of the terminal 200 and performs processing to report to and set the selected next master base station via, for example, a backhaul link. In this way, the master base station can be successively changed along with movement of the terminal 200. Note that the master base station need not be the base station communicating with the terminal to which the same radio resource was allocated.

As illustrated in FIG. 4, in the present embodiment, when the master base station 100A can predict that the terminals will move from P1 to P2, the master base station 100A allocates the same radio resource in the base station 100B while the terminals 200a, 200b, and 200c are still in the cell of the base station 100A. When the master base station 100A can predict that the terminals will then move from P2 to P3, the master base station 100A also allocates the same radio resource in the base station 100C preferably at an early point in time (at least before the terminals enter the cell of the base station 100C).

In order to perform such processing, it is advantageous to be able to predict the path of movement by the terminal 200 at a somewhat early stage. In the master base station, if the means by which the terminal 200 is moving can be determined, the path of movement by the terminal 200 can be predicted to some degree by acquiring a variety of map information. For example, in the master base station, when the means by which the terminal 200 is moving is determined to be a train, then given a railway map, the path of movement by the terminal 200 along the train line can be predicted to some degree from the current progress status. On the other hand, in the master base station, when the means by which the terminal 200 is moving is determined to be a car, bus, or the like, then given a road map, the path of movement by the terminal 200 along the road can be predicted to some degree from the current progress status.

Next, a specific example of the master base station allocating the same radio resource as the radio resource for the master base station in another base station is described further.

Figure 5:
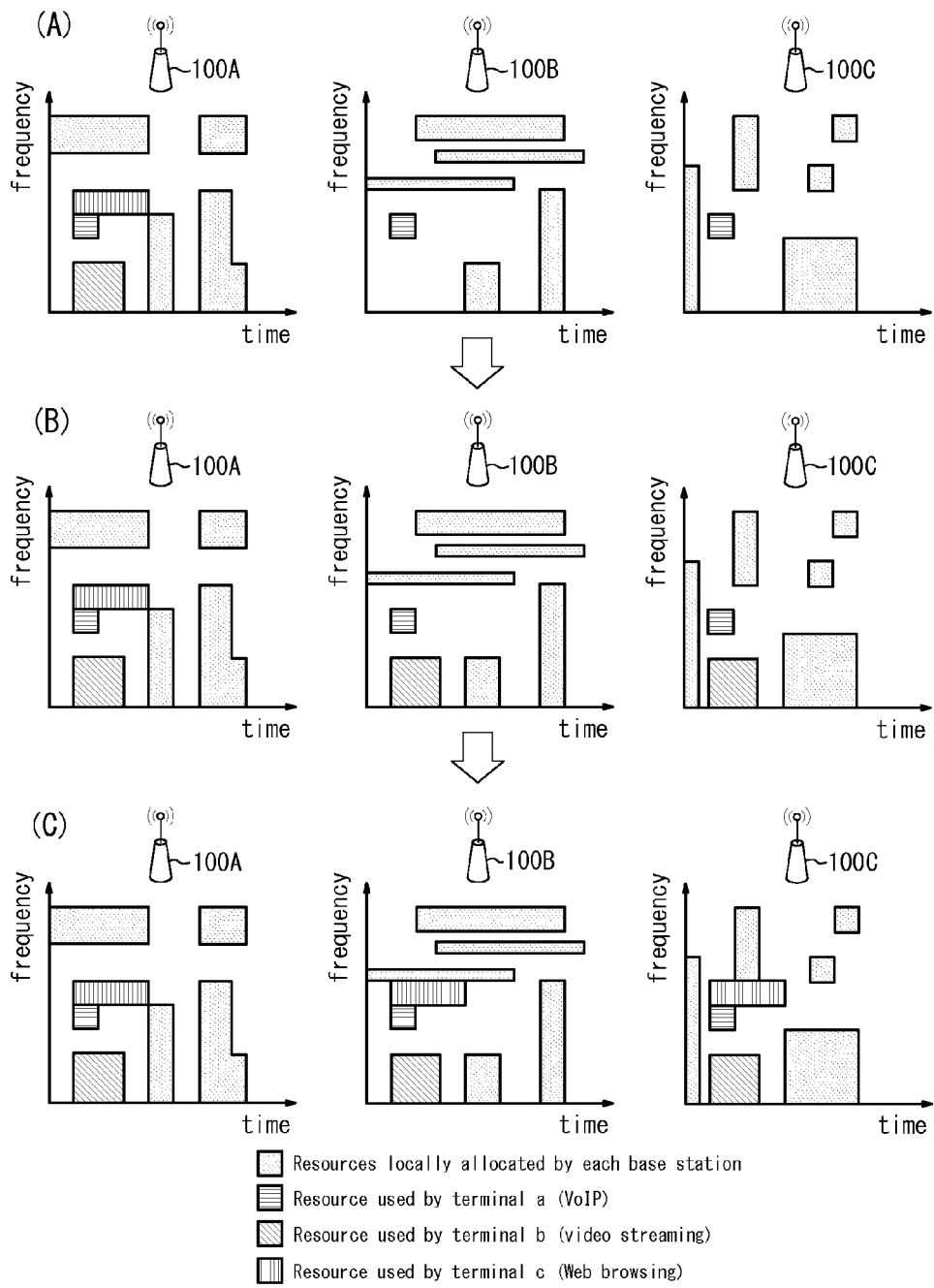
FIG. 5 illustrates an example of radio resource allocation according to an embodiment of the present invention.

FIG. 5 illustrates processing performed to allocate the same radio resource to the terminals 200a, 200b, and 200c in the base stations 100A, 100B, and 100C in FIG. 4. In FIG. 5, the change over time in the allocation state of radio resources is represented chronologically in the order of FIG. 5(A), FIG. 5(B), and FIG. 5(C). In each diagram within FIG. 5, the state of radio resources allocated within each base station is shown schematically, with the vertical axis representing frequency and the horizontal axis representing time.

Furthermore, in each diagram within FIG. 5, the regions in which radio resources are allocated are differentiated in accordance with the legend shown at the bottom of FIG. 5. For example, the region for the radio resource allocated to the terminal 200a, which is performing communication using VoIP, is indicated as a region with horizontal hatching. The region for the radio resource allocated to the terminal 200b, which is performing communication for video streaming, is indicated as a region with diagonal hatching. Furthermore, the region for the radio resource allocated to the terminal 200c, which is performing communication for Web browsing, is indicated as a region with vertical hatching. The regions having hatching with dashed lines indicate regions for radio resources allocated to terminals local to the respective base stations.

The example in FIG. 5 shows the case of communication congestion not occurring in any of the base stations 100A, 100B, and 100C. In this case, the master base station 100A allocates the same radio resource as the radio resource used for communication between the base station 100A and the terminal 200a in the other base stations 100B and 100C to be the radio resource used for communication between the other base stations 100B and 100C and the terminal 200a. When performing this allocation, the control unit 107 of the base station 100A allocates the radio resource used for communication between a terminal moving at at least a predetermined speed, for example such as 60 km/h, and the other base stations 100B and 100C on a priority basis in accordance with the content of the service in the communication. The control unit 107 also performs control to allocate the radio resource used for communication between the terminal moving at at least the predetermined speed and the other base station on a priority basis based on real-timeness and/or communication volume requested for the service in the communication.

For example, the control unit 107 can place the highest priority on allocating a radio resource used in communication that requires a high degree of real-timeness for the service in the communication, such as the communication using VoIP performed by the terminal 200a. The control unit 107 can also place the next highest priority on allocating a radio resource used in communication that does not require a high degree of real-timeness for the service in the communication yet that requires high speed (high communication volume), such as the communication for video streaming performed by the terminal 200b. Furthermore, the control unit 107 can place a relatively low priority on allocating a radio resource used in communication that requires neither a high degree of real-timeness for the service in the communication nor high speed (low communication volume), such as the communication for Web browsing performed by the terminal 200c. The above priorities for services in communication can be specified in advance in accordance with predetermined conditions. As weights for the order of priority of services in communication when allocating radio resources, real-timeness is preferably weighted higher than communication volume.

At the time shown in FIG. 5(A), in the master base station 100A, radio resources for the terminals 200a, 200b, and 200c are already allocated. With this sort of radio resource allocation, communication can be performed between the terminals 200a, 200b, and 200c and the master base station 100A. If the path of movement of these terminals is predicted to be within the radio wave range of the base stations 100B and 100C, the master base station 100A allocates the same radio resource as the radio resource used for communication with the terminal 200a, whose allocation is prioritized, to the other base stations 100B and 100C. In this way, as shown in FIG. 5(A), the same radio resource as the radio resource used for communication with the terminal 200a that is using VoIP is allocated in the other base stations 100B and 100C as well. As a result, even if the terminal 200a moves into the radio wave range of the base stations 100B and 100C, undesirable effects such as voice being cut off or delayed due to communication are avoided.

On the other hand, at the time shown in FIG. 5(A), radio resources for the terminals 200b and 200c have not yet been allocated in the base stations 100B and 100C. Accordingly, if the path of movement of these terminals is predicted to be within the radio wave range of the base stations 100B and 100C, the master base station 100A allocates the same radio resource as the radio resource used for communication with the terminal 200b, whose allocation has the next highest priority, to the other base stations 100B and 100C. In this way, as shown in FIG. 5(B), the same radio resource as the radio resource used for communication with the terminal 200b that is performing video streaming is allocated in the other base stations 100B and 100C as well. As a result, even if the terminal 200b moves into the radio wave range of the base stations 100B and 100C, video streaming can be performed normally.

By contrast, at the time shown in FIG. 5(B), a radio resource for the terminal 200c has not yet been allocated in the base stations 100B and 100C. Accordingly, if the path of movement of this terminal is predicted to be within the radio wave range of the base stations 100B and 100C, the master base station 100A allocates the same radio resource as the radio resource used for communication with the terminal 200c, whose allocation has the next highest priority, to the other base stations 100B and 100C. In this way, as shown in FIG. 5(C), the same radio resource as the radio resource used for communication with the terminal 200c that is performing Web browsing is allocated in the other base stations 100B and 100C as well. As a result, even if the terminal 200c moves into the radio wave range of the base stations 100B and 100C, Web browsing can be performed normally.

In this way, in the order of priority of terminals 200a, 200b, and 200c, the same radio resource can be allocated for each terminal in the base stations 100B and 100C other than the currently communicating base station.

Next, a specific example of processing when the master base station is allocating the same radio resource as the radio resource for the master base station in another base station is described further for the case of when congestion occurs in the other base station.

Figure 6:
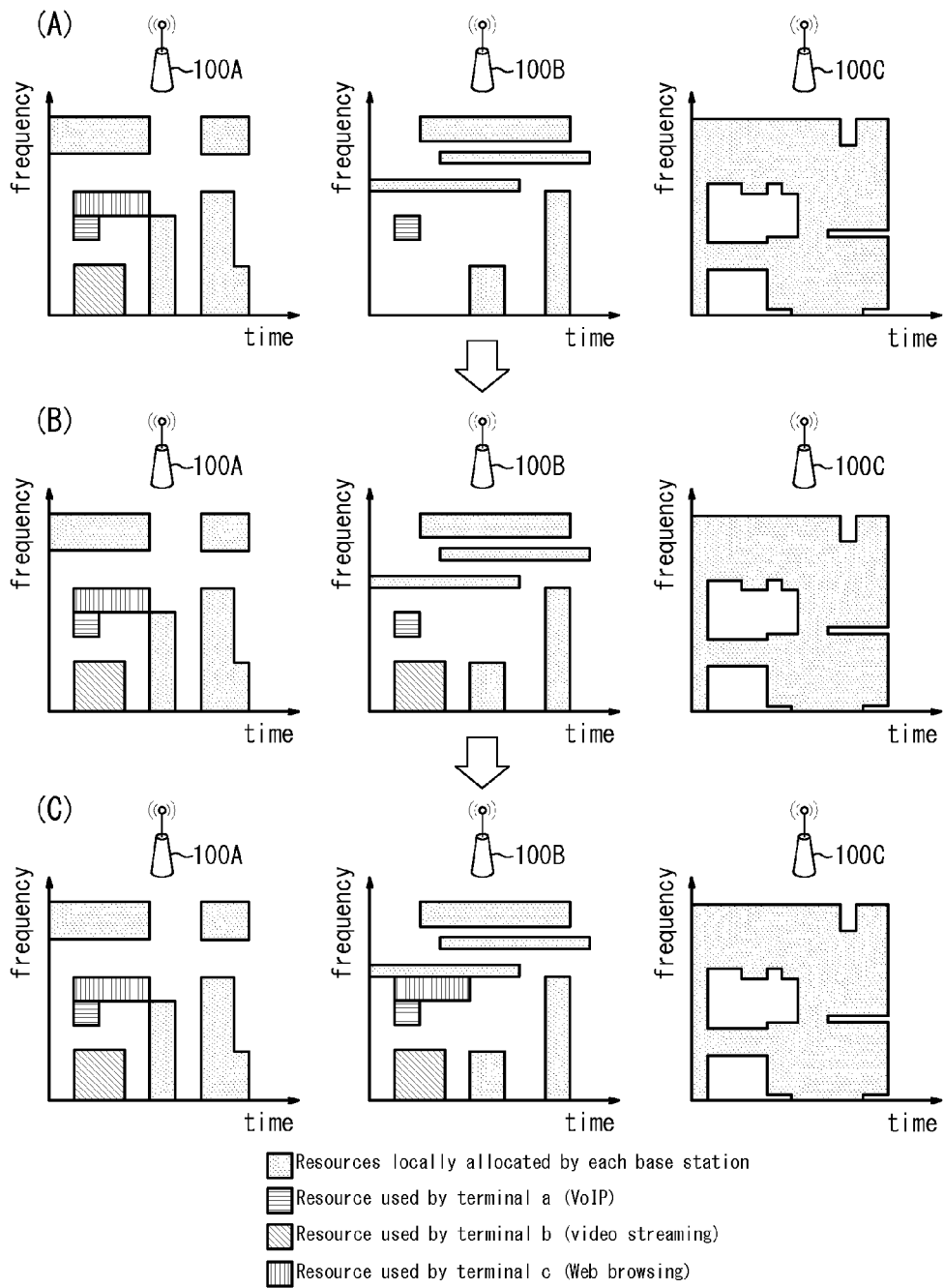
FIG. 6 illustrates another example of radio resource allocation according to an embodiment of the present invention.

The example in FIG. 6 shows the case of communication congestion occurring in the base station 100C. In this case, when congestion does not occur in the other base stations, the control unit 107 of the master base station 100A allocates the radio resource used for communication between a terminal moving at at least a predetermined speed and the other radio communication base stations on a priority basis in accordance with the content of the service in the communication. When congestion occurs in another base station, however, the control unit 107 performs control not to allocate the radio resource used for communication between the terminal moving at at least the predetermined speed and the other radio communication base station.

At the time shown in FIG. 6(A), in the master base station 100A, radio resources for the terminals 200a, 200b, and 200c are already allocated. If the path of movement of these terminals is predicted to be within the radio wave range of the other base stations 100B and 100C, the master base station 100A allocates the same radio resource as the radio resource used for communication with the terminal 200a, whose allocation is prioritized, to the other base station 100B. However, with regard to the other base station C in which congestion occurs, further allocation of a radio resource would increase the chance of blocking communication by the local radio communication terminals. Therefore, even if allocation of a radio resource were possible, the same radio resource is not allocated in the other base station C.

In this way, as shown in FIG. 6(A), the same radio resource as the radio resource used for communication with the terminal 200a that is using VoIP is allocated in the other base station 100B as well. On the other hand, as shown in FIG. 6(A), the same radio resource as the radio resource used for communication with the terminal 200a that is using VoIP is not allocated in the other base station 100C. As a result, when congestion occurs in the other base station C, the risk of blocking communication by the local terminals in the other base station C is eliminated by performing the radio resource allocation processing according to the present embodiment.

Subsequently, in the other base station B, as described for FIG. 5, the same radio resource as the radio resource used for communication with the terminal 200b is allocated in FIG. 6(B), and the same radio resource as the radio resource used for communication with the terminal 200c is allocated in FIG. 6(C). By contrast, in the other base station C in which congestion occurs, the same radio resource as the radio resource used for communication with the terminal 200b is not allocated in FIG. 6(B), nor is the same radio resource as the radio resource used for communication with the terminal 200c allocated in FIG. 6(C).

Next, a specific example of processing is described further for the case of when, after the master base station allocates the same radio resource as the radio resource for the master base station in another base station, congestion occurs in the other base station.

FIG. 7 shows an example in which communication congestion occurs in the base station 100C after radio resources have been allocated in a state in which communication congestion is not occurring in any of the base stations 100A, 100B, and 100C, for example as in the case illustrated in FIG. 5. In other words, FIG. 7 shows an example of communication congestion occurring in the base station 100C after the allocation shown, for example, from FIG. 5(A) to FIG. 5(C) in a state in which congestion is not occurring in any of the base stations.

When congestion occurs in the other base station 100C after allocation of a radio resource used for communication with a terminal moving at at least the predetermined speed, the control unit 107 of the master base station 100A performs control so that allocation of the radio resource that was allocated on a priority basis in accordance with content of service in the communication is released based on the priority at the time of allocation. In particular, in this case, the control unit 107 preferably performs control so that allocation of the radio resource that was allocated on a priority basis in accordance with content of service in the communication is released on a priority basis according to the opposite priority from the time of allocation.

At the time shown in FIG. 7(A), the master base station 100A has already allocated radio resources for the terminals 200a, 200b, and 200c in the other base stations 100B and 100C. At the time shown in FIG. 7(A), however, communication congestion occurs in the base station 100C.

In this case, the control unit 107 can, for example, perform control to release the already allocated same radio resources as the radio resources for the master base station according to the opposite priority from the priority, in accordance with the content of the communication service, when radio resources were allocated in FIG. 5.

In FIG. 7, congestion does not occur in the other base station 100B. Therefore, from FIG. 7(A) to FIG. 7(D), allocation of the same radio resources as the radio resources for the master base station 100A to the terminals 200a, 200b, and 200c is maintained in the other base station 100B.

Conversely, at the time shown in FIG. 7(A), congestion occurs in the other base station 100C. Therefore, from FIG. 7(A) to FIG. 7(D), allocation of the same radio resources as the radio resources for the master base station 100A to the terminals 200a, 200b, and 200c is released step-by-step in the other base station 100C. As described in FIG. 5, the priority when allocating radio resources is, from high to low, communication using VoIP performed by the terminal 200a, communication for video streaming performed by the terminal 200b, and communication for Web browsing performed by the terminal 200c. Accordingly, in the example shown in FIG. 7, the already allocated radio resources are released in the order of communication for Web browsing performed by the terminal 200c, communication for video streaming performed by the terminal 200b, and communication using VoIP performed by the terminal 200a.

In FIG. 7, allocation of the radio resource used in Web browsing performed by the terminal 200c, which had been allocated at the time of FIG. 7(A), has been released at the time of FIG. 7(B). Allocation of the radio resource used in video streaming performed by the terminal 200b, which had been allocated at the time of FIG. 7(B), has been released at the time of FIG. 7(C). Furthermore, allocation of the radio resource used in communication using VoIP performed by the terminal 200a, which had been allocated at the time of FIG. 7(C), has been released at the time of FIG. 7(D). As a result, when congestion occurs in the other base station C after radio resources had already been allocated, the risk of blocking communication by the local terminals in the other base station C is eliminated by performing the radio resource allocation processing according to the present embodiment.

Next, the flow of processing for the above-described allocation and release of radio resources according to the present embodiment is explained.

FIG. 8 is a flowchart showing radio resource allocation and release processing according to the embodiment of the present invention. The processing in the flowchart of FIG. 8 is assumed to be performed by the above-described master base station 100A, for example. The radio resource allocation and release processing according to the embodiment of the present invention as shown in the flowchart of FIG. 8 starts at the time when any of the base stations 100 is selected as a master base station upon receiving a report, from the terminal 200 with which the base station 100 is communicating, that the terminal 200 is moving at high speed. As described above, the determination of movement at high speed can be made, for example, by receiving a report of position information acquired by the GPS unit 212 of the terminal 200 and detecting that the terminal 200 is moving at a speed exceeding 60 km/h.

Upon the start of allocation and release processing according to the embodiment of the present invention, first the control unit 107 of the master base station 100 determines whether the path of movement of the terminal 200 first determined to be moving at high speed can be identified (step S11).

The determination in step S11 of whether the path of movement of the terminal 200 can be identified can be made using the position information acquired by the GPS unit 212 of the terminal 200. For example, the terminal 200 may report at regular intervals on GPS-based position information to the base station 100 with which the terminal 200 is communicating, and if the terminal 200 can, for example, be determined to be moving along a train track in map data stored by the base station 100 for the neighboring area, then the path of movement can be determined to be identifiable. Such map data may be prepared in advance or acquired as necessary and stored in the storage unit 108, for example, via control by the control unit 107 of the base station 100.

If it is determined in step S11 that the path of movement of the terminal 200 can be identified, the control unit 107 determines whether any of the base stations 100 along the path of movement of the terminal 200 is congested (step S12). The determination in step S12 of whether any of the base stations 100 is congested can be performed by, for example, the control unit 107 acquiring information from other base stations via the MME 310, the S-GW 320, or the like.

When none of the base stations 100 is congested in step S12, the control unit 107 performs radio resource allocation process starting with the base station close to the master base station 100 (step S13). The radio resource allocation processing in step S13 is preferably performed for all of the base stations that are located along the path of movement of the terminal 200 and are the target of allocation of the same radio resource. The processing performed in step S13 centers mainly on the processing described using FIG. 5. Accordingly, during the radio resource allocation processing in step S13, allocation is performed on a priority basis in accordance with content of service in the communication, as described above. Furthermore, during the radio resource allocation processing in step S13, radio resources are allocated on a priority basis based on real-timeness and/or communication volume requested for the service in the communication, as described above.

Conversely, when one of the base stations 100 is congested in step S12, the control unit 107 performs radio resource allocation process starting with a base station that is located along the path of movement of the terminal 200 other than the congested base station (step S14). The processing performed in step S14 centers mainly on the processing described using FIG. 6. In other words, in step S14, the control unit 107 does not perform radio resource allocation for a congested base station even if the base station is located along the path of movement of the terminal 200. Note that in step S14, the control unit 107 performs allocation on a priority basis in accordance with content of service in the communication, as described above, for base stations that are not congested. Furthermore, during the radio resource allocation processing in step S14 as well, radio resources are allocated on a priority basis based on real-timeness and/or communication volume requested for the service in the communication, as described above.

Once the radio resource allocation processing in step S13 or step S14 is complete, the control unit 107 determines whether, among the base stations for which the same radio resource has already been allocated, congestion has occurred in any base station other than the currently communicating base station 100 (step S15).

When congestion has occurred in one of the base stations 100 in step S15, the control unit 107 releases allocation of the same radio resource that has been allocated to that base station 100 (step S16). The processing performed in step S16 centers mainly on the processing described using FIG. 7. Note that in step S15, for determining whether congestion has occurred in any base station other than the currently communicating base station 100, the base station 100 in which congestion has occurred may be caused to transmit information indicating that congestion has occurred to the master base station 100 via the backhaul link. Also, in step S16, when releasing allocation of the same radio resource that had been allocated to the base station 100 in which congestion occurred, it is possible to release allocation, via the backhaul link, of the same radio resource for the base station 100 in which congestion occurred.

As described above, in step S16, the control unit 107, for example, can release the already allocated same radio resources as the radio resources for the master base station according to the opposite priority from the priority, in accordance with the content of the communication service, when radio resources were allocated. In other words, release of allocation of a radio resource used by a terminal 200 performing a service with a high communication volume and low real-timeness may be prioritized.

After release of radio resources in step S16, or when congestion has not occurred in any base station 100 in step S15, the control unit 107 determines whether any terminal 200 is still communicating (step S17). In step S17, the control unit 107 determines whether communication has ended for all of the terminals 200 targeted for allocation of the same radio resource. When the terminal 200 is still communicating in step S17, the control unit 107 performs the processing in step S15 and step S16 as a loop. Conversely, when a communicating terminal 200 no longer exists in step S17, the control unit 107 terminates the allocation and release processing according to the embodiment of the present invention. Note that when a change in the master base station 100 occurs during communication with the terminal 200, the processing in step S15 and step S16 is preferably performed as a loop in the new master base station 100.

As described above, according to the base station 100 of the present invention, the same radio resource is allocated in accordance with the type of service performed by a terminal 200 moving at high speed. Therefore, even if a terminal 200 moving at high speed is performing a service in which QoS is crucial, i.e. a service that is easily affected by delays due to handovers, the risk of undesirable effects in radio communication due to allocation of the same radio resource being blocked is reduced. Also, when congestion occurs in a base station 100 targeted for allocation of the same radio resource, radio resource allocation is not performed for the base station. Therefore, communication by the base station is not blocked as a result of performing radio resource allocation processing according to the present invention. Furthermore, after allocation of the same radio resource, when congestion is detected in a base station 100, for which the same radio resource had been allocated, other than the base station 100 closest to the terminal 200 moving at high speed, allocation of the same radio resource is released in the congested base station, so that communication by the congested base station is not blocked.

Although the present invention has been described based on the drawings and embodiment, it should be noted that various changes and modifications will be apparent to those skilled in the art based on the present disclosure. Therefore, such changes and modifications are to be understood as included within the scope of the present invention. For example, the functions and the like included in the various members, units, and steps may be reordered in any logically consistent way. Furthermore, units or steps may be combined into one or divided.

In the above embodiment, the mobile communication system has been assumed to be LTE. The present invention is not limited to LTE, however, and the present invention may be applied similarly to any radio communication system including a base station that changes allocation of radio resources in accordance with the type of service in the radio communication between a mobile terminal and the base station.

In the above-described example, GPS is used for acquiring position information when the terminal 200 is moving. As long as position information when the terminal 200 is moving can be acquired, however, the present invention is not limited to using GPS. For example, a configuration such as estimating the general position of the terminal 200 from information on the position of the base station 100 with which the terminal 200 is communicating is possible.

Furthermore, in the above-described embodiment, the master base station is selected from among the base stations 100, and the master base station manages and controls radio resource allocation in the other base stations. A configuration may also be adopted, however, in which a device at a higher hierarchical level than the master base station is provided, and the master base station may allocate radio resources in the other base stations based on instructions from this device.

REFERENCE SIGNS LIST

100: Radio communication base station
101: RF antenna
102: RF unit
103: Modulation/demodulation unit
104: Base station interface
105: OMT interface
106: BH interface
107: Control unit
108: Storage unit
200: Radio communication terminal
201: RF antenna
202: RF unit
203: Modulation/demodulation unit
204: Control unit
205: Storage unit
206: Input unit
207: Decoder
208: Microphone
209: Speaker
210: Display unit
211: GPS antenna
212: GPS unit
310: MME
320: S-GW
330: P-GW
400: IMS

The invention claimed is:

1. A radio communication base station that allocates the same radio resource as a radio resource used for communication between the radio communication base station and a radio communication terminal in other radio communication base station to be a radio resource used in the other radio communication base station for communication between the other radio communication base station and the radio communication terminal, the radio communication base station comprising:

a control unit configured to perform control to allocate a radio resource used for communication between a radio communication terminal moving at at least a predetermined speed and the other radio communication base station prior to a radio resource used for communication between the other radio communication base station and other radio communication terminal in accordance with content of service in the communication, wherein the control unit performs control to allocate the radio resource used for communication between the radio communication terminal moving at at least the predetermined speed and the other radio communication base station in accordance with content of service in the communication when congestion does not occur in the other radio communication base station, when congestion occurs in the other radio communication base station after allocation of the radio resource used for communication between the radio communication terminal moving at at least the predetermined speed and the other radio communication base station, the control unit performs control so that allocation of the radio resource that was allocated in accordance with content of service in the communication is released based on priority at a time of allocation, and the control unit performs control so that allocation of the radio resource that was allocated in accordance with content of service in the communication is released according to an opposite priority from the time of allocation.

2. The radio communication base station according to claim 1, wherein the control unit performs control to allocate the radio resource used for communication between the radio communication terminal moving at at least the predetermined speed and the other radio communication base station based on real-timeness and/or communication volume requested for service in the communication.

3. The radio communication base station according to claim 1, wherein the control unit performs control not to allocate the radio resource used for communication between the radio communication terminal moving at at least the predetermined speed and the other radio communication base station when congestion occurs in the other radio communication base station.

4. The radio communication base station according to claim 2, wherein the control unit performs control to allocate the radio resource used for communication between the radio communication terminal moving at at least the predetermined speed and the other radio communication base station in accordance with content of service in the communication when congestion does not occur in the other radio communication base station.

* * * * *